US008084732B2

(12) United States Patent
Laprade (10) Patent No.: US 8,084,732 B2
(45) Date of Patent: Dec. 27, 2011

(54) RESISTIVE GLASS STRUCTURES USED TO SHAPE ELECTRIC FIELDS IN ANALYTICAL INSTRUMENTS

(75) Inventor: Bruce N. Laprade, Holland, MA (US)

(73) Assignee: Burle Technologies, Inc., Wilmington, DE (US)

( * ) Notice: Subject to any disclaimer, the term of this patent is extended or adjusted under 35 U.S.C. 154(b) by 52 days.

(21) Appl. No.: 12/644,078

(22) Filed: Dec. 22, 2009

(65) Prior Publication Data

US 2010/0090098 A1   Apr. 15, 2010

Related U.S. Application Data

(63) Continuation of application No. 11/683,713, filed on Mar. 8, 2007, now abandoned.

(60) Provisional application No. 60/781,088, filed on Mar. 10, 2006.

(51) Int. Cl.
- H01J 49/26    (2006.01)
- G21K 1/08     (2006.01)
- B44C 1/22     (2006.01)

(52) U.S. Cl. .................. 250/281; 250/282; 250/287
(58) Field of Classification Search .......... 250/287, 250/288, 290, 293, 295, 299, 281–283, 396 R, 250/397; 422/186.05
See application file for complete search history.

(56) References Cited

U.S. PATENT DOCUMENTS

| | | | |
|---|---|---|---|
| 2,680,826 A * | 6/1954 | O'Neill et al. | 315/5.19 |
| 2,841,729 A | 7/1958 | Wiley | |
| 2,841,879 A | 7/1958 | Wiley | |
| 3,197,663 A | 7/1965 | Norman et al. | |
| 3,424,909 A | 1/1969 | Rougeot | |
| 3,488,509 A | 1/1970 | Goodrich | |
| 3,519,870 A | 7/1970 | Jensen | |
| 3,634,712 A | 1/1972 | Orthuber | |
| 3,673,449 A | 6/1972 | Eschard | |
| 3,675,063 A | 7/1972 | Spindt et al. | |
| 3,819,941 A * | 6/1974 | Carrico | 250/281 |
| 3,885,180 A | 5/1975 | Carts, Jr. | |
| 3,902,089 A | 8/1975 | Beasley et al. | |
| 3,911,167 A | 10/1975 | Linder | |

(Continued)

FOREIGN PATENT DOCUMENTS

CA    1121858    4/1982

(Continued)

OTHER PUBLICATIONS

J.P. Boutot, "Degassing of microchannel plates," ACTA Electronica, vol. 14, No. 2, 1971, pp. 245-262.

(Continued)

*Primary Examiner* — Bernard E Souw
(74) *Attorney, Agent, or Firm* — Dann, Dorfman, Herrell and Skillman, P.C.

(57) ABSTRACT

A reflectron lens for a time-of-flight mass spectrometer and a method of making same are disclosed. The reflectron lens includes a glass tube having a conductive surface along the length of the tube. The conductive surface has an electrical resistance gradient along its length. The electrical resistance gradient provides an electric field interior to the tube that varies in strength along the length of the tube when an electric potential is applied to opposing ends of the tube. A mass spectrometer incorporating the reflectron lens, a method of making the reflectron lens, and an apparatus for removing lead from the surface of a lead silicate glass tube are also disclosed.

21 Claims, 10 Drawing Sheets

U.S. PATENT DOCUMENTS

| | | | |
|---|---|---|---|
| 3,959,038 A | | 5/1976 | Gutierrez et al. |
| 3,976,905 A | | 8/1976 | Seidman et al. |
| 3,996,474 A | * | 12/1976 | Lowther .................. 422/186.07 |
| 4,015,159 A | | 3/1977 | Zipfel, Jr. |
| 4,051,403 A | | 9/1977 | Feingold et al. |
| 4,073,989 A | | 2/1978 | Wainer |
| 4,093,562 A | | 6/1978 | Kishimoto |
| 4,095,136 A | | 6/1978 | Niklas |
| 4,099,079 A | | 7/1978 | Knapp |
| 4,126,781 A | * | 11/1978 | Siegel ........................... 250/281 |
| 4,217,489 A | | 8/1980 | Rosier |
| 4,236,073 A | | 11/1980 | Martin |
| 4,267,442 A | | 5/1981 | Rosier |
| 4,352,985 A | | 10/1982 | Martin |
| 4,390,784 A | * | 6/1983 | Browning et al. ............ 250/287 |
| 4,454,422 A | | 6/1984 | Persyk |
| 4,468,420 A | | 8/1984 | Kawahara et al. |
| RE31,847 E | | 3/1985 | Luckey |
| 4,558,144 A | | 12/1985 | Fay et al. |
| 4,563,250 A | | 1/1986 | Becker et al. |
| 4,577,133 A | | 3/1986 | Wilson |
| 4,589,952 A | | 5/1986 | Behringer et al. |
| 4,598,037 A | * | 7/1986 | Felten ........................ 430/281.1 |
| 4,624,736 A | | 11/1986 | Gee et al. |
| 4,624,739 A | | 11/1986 | Nixon et al. |
| 4,659,429 A | | 4/1987 | Isaacson et al. |
| 4,693,781 A | | 9/1987 | Leung et al. |
| 4,698,129 A | | 10/1987 | Puretz et al. |
| 4,707,218 A | | 11/1987 | Giammarco et al. |
| 4,714,861 A | | 12/1987 | Tosswill |
| 4,725,332 A | | 2/1988 | Spohr |
| 4,731,559 A | | 3/1988 | Eschard |
| 4,734,158 A | | 3/1988 | Gillis |
| 4,740,267 A | | 4/1988 | Knauer et al. |
| 4,764,245 A | | 8/1988 | Grewal |
| 4,780,395 A | | 10/1988 | Saito et al. |
| 4,786,361 A | | 11/1988 | Sekine et al. |
| 4,790,903 A | | 12/1988 | Sugano et al. |
| 4,794,296 A | | 12/1988 | Warde et al. |
| 4,800,263 A | | 1/1989 | Dillon et al. |
| 4,802,951 A | | 2/1989 | Clark et al. |
| 4,806,827 A | | 2/1989 | Eschard |
| 4,825,118 A | | 4/1989 | Kyushima |
| 5,086,248 A | | 2/1992 | Horton et al. |
| 5,109,157 A | * | 4/1992 | Loen ............................. 250/287 |
| 5,162,649 A | * | 11/1992 | Burke ........................... 250/287 |
| 5,205,902 A | | 4/1993 | Horton et al. |
| 5,351,332 A | | 9/1994 | Cook |
| 5,378,960 A | | 1/1995 | Tasker et al. |
| 5,726,076 A | | 3/1998 | Tasker et al. |
| 5,834,771 A | * | 11/1998 | Yoon et al. ................... 250/286 |
| 6,008,491 A | | 12/1999 | Smentkowski et al. |
| 6,369,383 B1 | | 4/2002 | Cornish et al. |
| 6,607,414 B2 | | 8/2003 | Cornish et al. |
| 6,717,135 B2 | | 4/2004 | Hansen |
| 6,825,474 B2 | | 11/2004 | Young |
| 7,141,787 B2 | * | 11/2006 | Laprade ........................ 250/287 |
| 7,154,086 B2 | * | 12/2006 | Laprade ........................ 250/287 |
| 2003/0230726 A1 | * | 12/2003 | Van der Veer et al. .... 250/396 R |
| 2004/0183028 A1 | * | 9/2004 | Laprade ..................... 250/396 R |
| 2005/0109930 A1 | * | 5/2005 | Hill et al. ...................... 250/286 |
| 2008/0073516 A1 | * | 3/2008 | Laprade ........................ 250/293 |
| 2008/0173809 A1 | * | 7/2008 | Wu ................................ 250/283 |

FOREIGN PATENT DOCUMENTS

| | | |
|---|---|---|
| EP | 0704879 | 4/1996 |
| GB | 2180986 | 4/1987 |
| JP | 62119121 | 5/1987 |

OTHER PUBLICATIONS

N.R. Rajopadhye et al., "Characterization of $Al_2O_3$ Films Deposited by Various Methods," Thin Solid Films, 142 (1986) 127-138.

A.M. Then et al., "Formation and Behavior of Surface Layers on Electron Emission Glasses," Jour. of Non-Crystalline Solids 120 (1990) 178-187.

N.R. Whetten et al., "Secondary Electron Emission from MgO Thin Films," Journal of Applied Physics, vol. 30, No. 3, (Mar. 1959), pp. 432-435.

E. Gatti et al., "Study of the Electric Field Inside Microchannel Plate Multipliers," © 1983 IEEE. pp. 1-8.

L.P. Andersson et al., "The Parallel-Plate Electron Multiplier," © 1979 The Institute of Physics, 1015-1022.

L.H. Van Vlack, Elements of Materials Science & Engineering, Addison-Wesley, Reading, MA, 1980, p. xii.

M. Lampton, "The Microchannel Image Intensifier," Sci. Am. Nov. 1981, vol. 245, No. 5 pp. 62-71.

A.M. Tyutikov et al., "Study of the Surface Layer Composition and the Secondary Electron Emission Coefficient at Lead Silicate Glasses," Sov.J.Opt.Technol. (Apr. 1980), pp. 201-203.

Ju.M. Simeonova et al., "Surface Compositional Studies of Heat Reduced Lead Silicate Glass," Jour. of Non-Crystalline Solids, 57 (1983), 177-187.

N.R. Whetton, Methods of Experimental Physics, Academic Press, New York 1964, pp. 69-85.

R.U. Martinelli et al., "The Application of Semiconductors with Negative Electron Affinity Surfaces to Electron Emission Devices," Proceedings of the IEEE, vol. 62, No. 10, (Oct. 1974), pp. 1339-1360.

D. Washington et al., "Technology of Channel Plate Manufacture," ACTA Electronica vol. 14, No. 2, 1971, pp. 201-224.

H.J.L. Trap, "Electronic Conductivity in Oxide Glasses," ACTA Electronica, vol. 14, No. 1, 1971, pp. 41-77.

G.E. Hill, "Secondary Electron Emission and Compositional Studies on Channel Plate Glass Surfaces," Advances in Electronics and Electron Physics, vol. 40A Ed. 2, Academic Press 1976, pp. 153-165.

W. Kern et al., "Chemical Vapor Deposition of Inorganic Thin Films," Thin Film Processes, © 1978 Academic Press, Inc. pp. 257-331.

P.D. Dapkus "Metalorganic Chemical Vapor Deposition," Ann. Rev. Mater. Sci., 1982 12:243-69.

A.C. Adams, "Dielectric and Polysilicon Film Deposition," VLSI Technology, McGraw-Hill, New York 1983, pp. 93-129.

M.L. Green et al., "Chemical Vapor Deposition of Metals for Integrated Circuit Applications," Jour. of Metals, Jun. 1985, pp. 63-71.

S. Wolf et al., "Silicon Epitaxial Film Growth," Silicon Processing for the VLSI Era, pp. 124-159.

A. R. Coulson et al., "Chemical Vapor Deposition of Amorphous and Polycrystalline Thin Films,", Silicon Processing for the VLSI Era, pp. 161-197.

"Thermal Oxidation of Single Crystal Silicon," © 1965 IEEE, pp. 198-241.

D.P. Stinton et al., "Advanced Ceramics by Chemical Vapor Deposition Techniques," Ceramic Bulletin, vol. 67, No. 2, 1988, pp. 350-355.

J.R. Hollahan et al., "Plasma Deposition of Inorganic Thin Films," Thin Films Processes, Academic Press Inc., © 1978. pp. 335-360.

P.K. Bachman et al., "Plasma-Assisted Chemical Vapor Deposition Processes," MRS Bulletin, Dec. 1988, pp. 52-59.

M.J. Mayo, "Photodeposition: Enhancement of Deposition Reactions by Heat and Light," Solid State Technology, Apr. 1986 , pp. 141-144.

C.G. Pantano, "Electron Beam Damage in Auger Electron Spectroscopy," Application of Surface Science 7, (1981), pp. 115-141.

W.B. Feller et al., "Low Noise Microchannel Plates," SPIE Conf., Los Angeles, CA, Jan. 15-20, 1989. pp. 1-13.

G.W. Goodrich et al., "Resistance Strip Magnetic Electron Multiplier," The Review of Scientific Instruments, vol. 32, No. 7, (Jul. 1961), pp. 846-849.

K. Oba, "An Analysis of the Direct Current Operation of Channel Electron Multipliers," Advances in Electronics and Electron Physics, Academic Press 1972, pp. 183-205.

H. Becker, "Preparation and Characteristics of a Channel Electron Multiplier," The Review of Scientific Instruments, vol. 43, No. 11, (Nov. 1972) pp. 1587-1589.

Y. Sakai, "Study of Gain Fatigue Mechanism in Channel Electron Multipliers," Surface Science 86 (1979) pp. 359-368.

A.A. Manalio et al., "More Efficient Channel Electron Multiplier by Coating of the Cone with a High Secondary Electron Yield Material," Rev. Sci. Instru. S2(10), Oct. 1981, pp. 1490-1492.

G. Harbeke, "LPCVD Polycrystalline Silicon: Growth and Physical Properties of In-Situ Phosphorus Doped and Undoped Films," RCA Review, vol. 44, Jun. 1983, pp. 287-312.

R.V. Prasad et al., "Semi-Insulating Polysilicon: Growth, Processing and Structural Characterization," Materials Letters, vol. 4, No. 2, (Feb. 1986). pp. 71-76.

Handbook of Thin Film Technology, edited by L.I. Maissel et al., McGraw-Hill, New York 1983, p. 6-18.

K.I. Grais et al., "A study of secondary electron emission in insulators and semiconductors," J. Appl. Phys. 53(7), Jul. 1982, pp. 5239-5242.

N. Iwase, "Aluminum Nitride Substrates Having High Thermal Conductivity," Solid State Technology (Oct. 1986), pp. 135-138.

H. Nagayama et al., "A New Process for Silica Coating,"Jour. of the Electrochemical Society, vol. 135, No. 8 (Aug. 1988), pp. 2013-2016.

R.H. Sokol et al., "Characterization of Single Channel Electron Multipliers," Mass Spec Source, vo. XI, No. 2, (Aug. 1988) pp. 26-29.

R.J. Cotter, "Time-of-Flight Mass Spectrometry for the Structural Analysis of Biological Molecules" Analytical Chemistry, vol. 64, No. 21,m (1992) pp. 1027-1038.

E. Hoffman et al., "Time-of-Flight Analyzers" Mass Spectrometry, Wiley Press (1996) pp. 59-66.

B. Laprade et al., "Development of a 2-um-Pore Microchannel Plate" Spectrometry, (Oct. 2001) pp. 54-61.

M.F. Appel et al., "Conductive Carbon Filled Polymeric Electrodes: Novel Ion Optical Elements for Time-of-Flight Mass Spectrometers", Am. Soc. for Mass Spectrometry, pp. 1170-1175.

G. Eschard et al., "Principle and characteristics of channel electron multipliers", ACTA Electronica, vol. 14, No. 1, 1971, pp. 19-39.

R.S. Eble et al., "Low Temperature Aluminum Oxide Deposition Using Trimethylaluminum", Jour. of Electronic Materials, vol. 12, No. 3, 1983, pp. 587-601.

J.R. Horton et al., Characteristics and applications of advanced technology microchannel plates, SPIE vol. 1306 Sensor Fusion III (1990), pp. 169-178.

G.W, Tasker et al., "Thin-Film Amorphous Silicon Dynodes for Electron Multiplication", Mat. Res. Soc. Symp. Proc. vol. 192, (1990), pp. 459-465.

R.S. Eble, "Low Temperature Aluminum Oxide Deposition Using Trimethyaluminum," Jour. of Electronic Materials, vol. 12, No. 3, 1983, pp. 587-601.

G. Eschard et al., "Principle and Characteristics of Channel Electron Multipliers," ACTA Electronica, vol. 14, No. 1, 1971, pp. 19-39.

Cotter, Robert J., "Time-of-Flight Mass Spectrometry for the Structural Analysis of Biological Molecules" Analytical Chemistry, vol. 64, No. 21, (1992) pp. 1027-1038.

Hoffman, E., Charette, J., and Stroobant, V., "Time-of-Flight Analyzers" Mass Spectrometry, Wiley Press (1996) pp. 59-66.

Laprade, B. and Starcher, R., "Development of a 2-um-Pore Microchannel Plate" Spectrometry, (Oct. 2001) pp. 54-61.

Trap, H.J.L., "Electronic Conductivity in Oxide Glasses" ACTA Electronica, vol. 14. No. 1, (1971) pp. 41-77.

M. F. Appel et al. "Conductive Carbon Filled Polymeric Electrodes: Novel Ion Optical Elements for Time-of-Flight Mass Spectrometers" Journal of American Society for Mass Spectrometry, Elsevier Science Inc., New York, NY, vol. 13, No. 10, Oct. 2002, pp. 1170-1175.

* cited by examiner

RESISTIVE GLASS STRUCTURES USED TO SHAPE ELECTRIC FIELDS IN ANALYTICAL INSTRUMENTS

CROSS REFERENCE TO RELATED APPLICATION

This application is a continuation of U.S. Nonprovisional application Ser. No. 11/683,713, filed Mar. 8, 2007 now abandoned, which claims the benefit of U.S. Provisional Application No. 60/781,088, filed Mar. 10, 2006, the entireties of which are incorporated herein by reference.

BACKGROUND OF THE INVENTION

This invention relates generally to mass spectrometers, and in particular to a reflectron type time-of-flight mass spectrometer and to a glass reflectron lens for such a spectrometer wherein the lens has a gradient electrical resistance on its surface.

Mass spectrometers are analytical instruments capable of identifying unknown materials in complex mixtures with precision in the parts per billion range. Once used exclusively in research laboratories, mass spectrometers are now in use in a broad range of applications. They are used in screening for pesticides in canned foods, controlling semiconductor manufacturing processes, diagnosing disease, exploring for natural resources, discovering new pharmaceuticals, predicting volcano eruptions, and security systems. Indeed, these instruments have traveled beyond our world aboard the Galileo and Cassini spacecrafts to provide atmospheric analysis of neighboring worlds within our solar system.

Time of Flight Mass Spectrometry (TOF-MS) is rapidly becoming the most popular method of mass separation in analytical chemistry. The development of low cost digitizers and extremely fast ion detectors has fueled this popularity. TOF-MS is easily deployed and can produce very high mass resolution. This technique of mass separation can be adapted for many forms of sample introduction and ionization. Unlike quadrupoles and ion traps, time of flight mass analyzers perform well with very high mass molecules of the type frequently found in protean applications. Wiley and McLaren in 1955, followed by Cotter in 1992, and Wollnik in 1993 have described time of flight mass analyzers.

Time-of-flight mass spectrometers are produced in two main types: linear instruments and reflectron instruments.

Linear Time of Flight Mass Spectrometers

Figure 1:
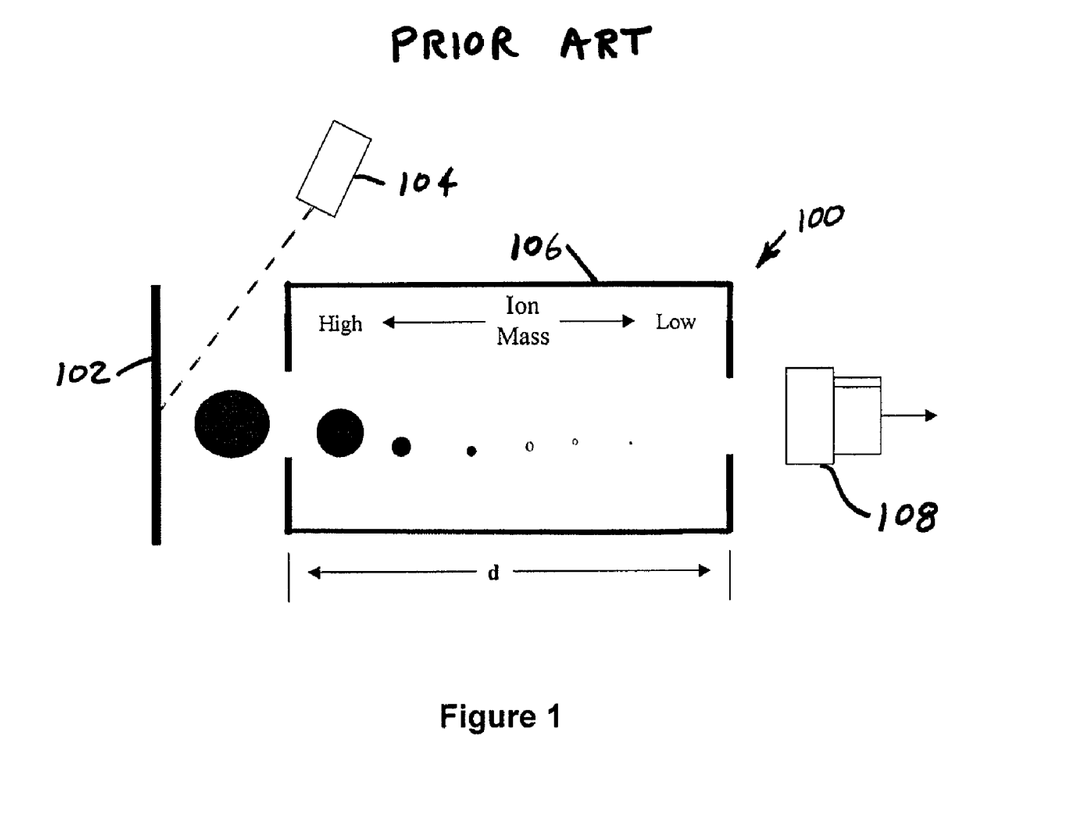
FIG. 1 is a schematic diagram of a linear time-of-flight mass spectrometer.

FIG. 1 illustrates a linear time of flight mass spectrometer embodied as a matrix assisted laser desorption ionization (MALDI) instrument 100. In a linear time of flight mass spectrometer, an unknown sample is first converted to ions. The sample is deposited on a plate 102. A light beam from a laser 104 is directed at the sample on plate 102 which causes the sample to ionize. The resultant ions are injected into a flight tube 106 wherein they travel towards the ion detector 108. The detector may be embodied as a microchannel-plate type detector as described in U.S. Pat. No. 6,828,729, the entire disclosure of which is incorporated by reference.

The motion of the ions within the flight tube can be described by the following equation.

$$t^2 = m/z(d^2/2V_{se})$$

In Equation 1, m/z is the mass to charge ratio of the ion, d is the distance to the detector, and $V_{se}$ is the acceleration potential.

The lighter ions (i.e. ions having relatively lower masses) travel toward the detector 108 faster than the higher mass ions. If the flight tube is long enough, the ions will arrive at the detector according to their mass, i.e., lowest to highest.

Figure 2:
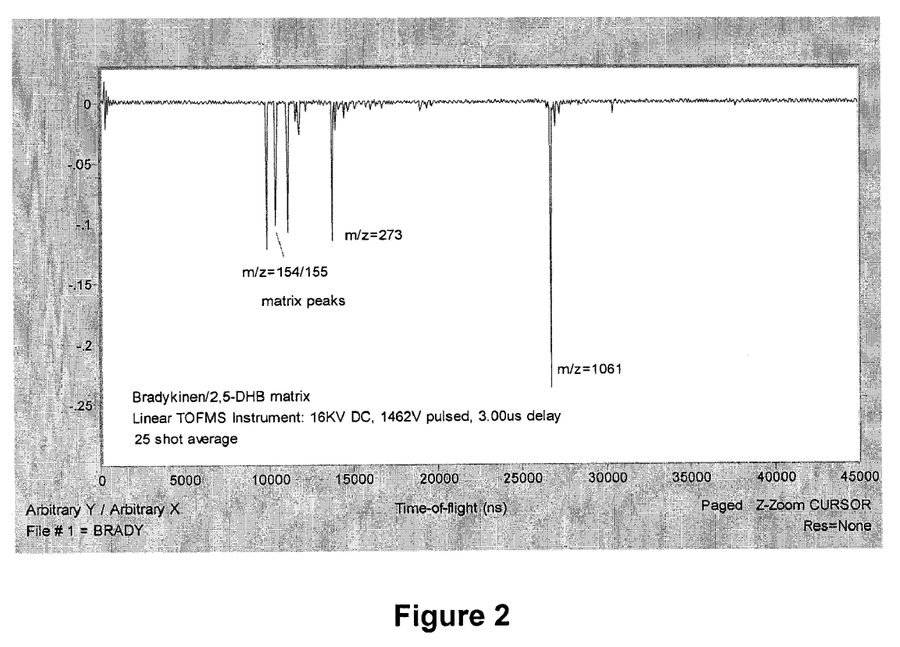
FIG. 2 is a graph of the response of a linear time-of-flight mass spectrometer for a sample of Brandykinin.

When the ions arrive at the detector 108, they initiate a cascade of secondary electrons within the detector, which results in the generation of a series of very fast voltage pulses. The voltage pulses precisely signal the arrival of the ions. A high-speed oscilloscope or transient recorder is used to record the arrival times. FIG. 2 illustrates the arrival time spectrum of a sample of Brandykinin analyzed on a linear time of flight mass spectrometer. Knowing the exact arrival times, Equation 1 can be used to solve for the mass-to-charge ratios of the ions.

Reflectron-Type Time of Flight Mass Spectrometer

Figure 3:
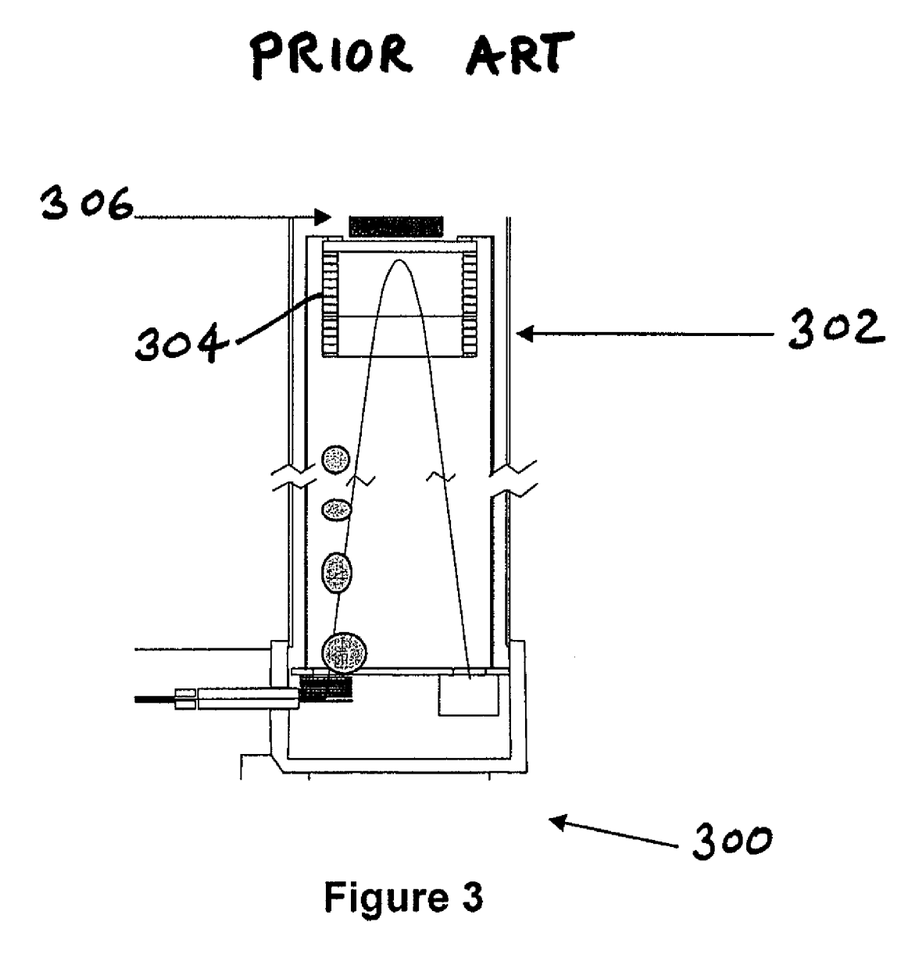
FIG. 3 is a schematic diagram of a reflectron type mass spectrometer.

The second type of time-of-flight mass spectrometer is the reflectron instrument. FIG. 3 illustrates a known arrangement of a reflectron TOF mass spectrometer 300. The reflectron design takes advantage of the fact that the further the ions are allowed to travel, the greater the distance between ions of slightly differing masses. Greater distances between ions with different masses will increase the arrival time differences between the ions and thereby increase the resolution at which ions having similar mass-to-charge ratios (m/z) can be differentiated. In addition, the reflectron design corrects for the energy dispersion of the ions leaving the source.

Figure 4:
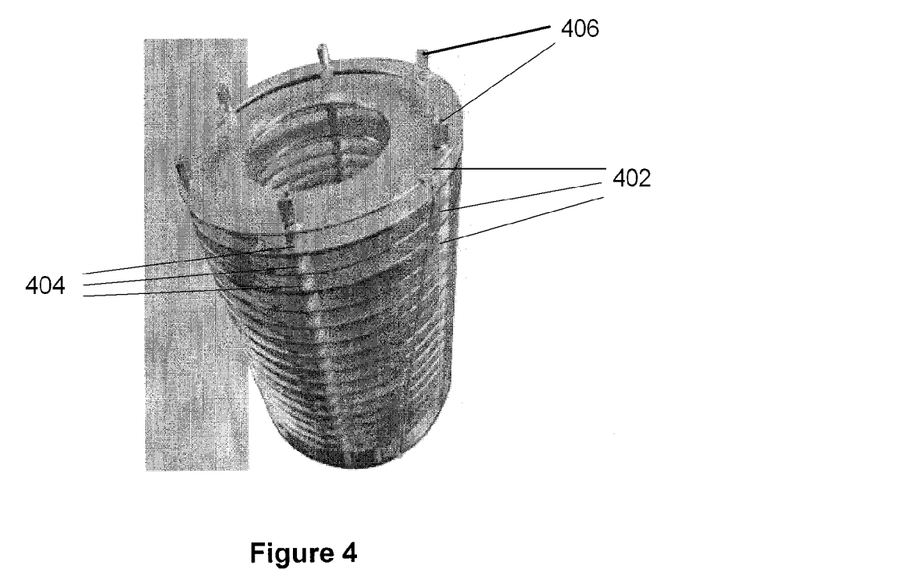
FIG. 4 is a photograph of a metal-ring reflectron lens.

In the reflectron analyzer 300, the ions are injected into the flight tube 302 in the same manner as in a linear instrument described above. The ions travel down the flight tube and enter the reflectron lens 304. FIG. 4 shows the construction of a known reflectron lens. It consists of a plurality of stacked metal rings that are spaced and insulated from each other. An electrostatic field is created within the reflectron lens 304 by applying different high voltage potentials to each of the metal rings. The electrostatic field has a polarity that causes the ions to decelerate and eventually reverse their direction. The ions exit the lens 304 and are directed to the ion detector 306. The action of the reflectron lens on the ions effectively doubles their length of travel in the flight tube. The additional travel time improves mass resolution without adding additional length to the flight tube.

Most time of flight instruments manufactured today incorporate reflectron lenses. As shown in FIG. 4 a reflectron lens consists of a stack of precision ground metal rings 402 alternating with insulating spacers 404. The rings and spacers are held together with threaded rods 406. The reflectron lens assembly may have hundreds of components which must be carefully assembled and aligned (typically by hand) in a clean, dust free environment. Additionally, a voltage divider must be included in each row or layer in order to produce the electrostatic field gradient necessary to reverse the direction of the ions.

Figure 5:
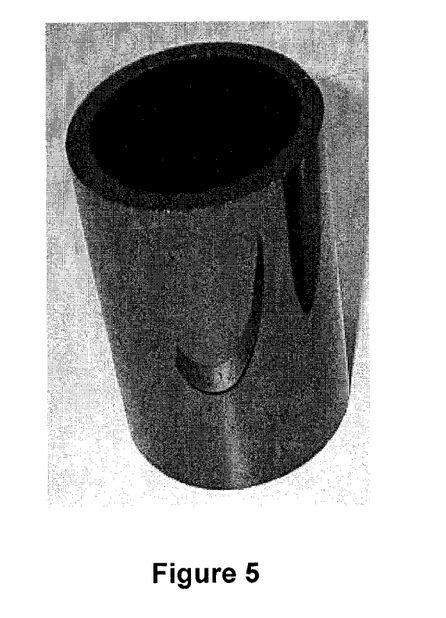
FIG. 5 is a photograph of a glass reflectron lens.

An improved variant of the classical reflectron lens design utilizes a single resistive glass tube to generate the gradient electric field. A resistive glass tube reflectron lens is shown in FIG. 5. The monolithic structure of the resistive glass tube replaces the multi-component assembly of the metal ring type of reflectron lens.

Reflectron lenses fabricated from resistive glass tubes have thus far been produced with a uniform resistance along the inside of the tube. That architecture is useful for many reflectron geometries. However, a significant performance advantage and greater design flexibility could be realized if the electrical resistance varied discretely or continuously along the length of the lens.

Resistive glass reflectron lenses are fabricated from lead silicate glass that has been subjected to a hydrogen reduction process to produce a thin resistive layer on the inside surface of the tube. A resistive glass reflectron lens is described in U.S. Pat. No. 7,154,086, the entire disclosure of which is incorporated herein by reference.

The hydrogen reduction process consists of loading the glass tube into a closed furnace through which pure hydrogen or a controlled mixture of hydrogen and oxygen is purged. The temperature is gradually increased, typically at a rate of 1-3 degrees per minute. Beginning at approximately 250° C., a chemical reaction occurs in the glass in which the lead oxide in the glass converts to a semi-conductive state. This reaction occurs in the first few hundred angstroms of the cross section of the glass. As the glass continues to be heated in the presence of the hydrogen, more of the lead oxide is chemically reduced, thereby providing lower electrical resistance. Temperature, time, gas pressure, and gas flow can be controlled to provide a desired amount of electrical resistance on the surface of the glass.

The electrical resistance is also dependent on the composition of the glass. For example, a glass containing more lead oxide with a modifier such as bismuth can be used to produce lower resistances. The hydrogen reduction process makes all surfaces of the glass tube conductive. Unwanted conductive surfaces can be stripped by chemical or mechanical means.

A known hydrogen reduction process has the following parameters:

3 hour ramp up from RT to 200° C.;
1 hour ramp up from 200 to 300° C.;
12.5 hour ramp up from 300 to 445° C.;
hold at 445° C. for 3 hours in hydrogen at a pressure of 34 psi and a hydrogen flow of 40 l/m.

The reduction temperature is limited on the low end by the minimum temperature needed to sustain the reaction and is limited on the high side by the sag point of the glass.

In some applications, it is desirable to produce a segmented resistive tube in which certain sections of the tube have significantly different values of electrical resistance. In other applications it is desirable to have a continuous resistance gradient in which the resistance along the wall varies continuously along the length of the tube. The variation may be linear or nonlinear. For example, an orthogonal geometry time of flight mass spectrometer utilizes a reflectron tube having a nonlinear resistance characteristic. U.S. Pat. No. 7,081,618, the entire disclosure of which is incorporated herein by reference, and U.S. Pat. No. 7,154,086 describe methods to produce a uniform electrical resistance in a lead silicate glass tube by subjecting the tube to a reducing environment within a hydrogen furnace.

SUMMARY OF THE INVENTION

In accordance with a first aspect of the present invention there is provided a reflectron lens for a time-of-flight mass spectrometer that includes a glass tube having a conductive surface along the length of the tube. The conductive surface has an electrical resistance gradient along its length. The electrical resistance gradient provides an electric field interior to the tube that varies in strength along the length of the tube when an electric potential is applied to opposing ends of the tube.

In accordance with a second aspect of the present invention there is provided a time-of-flight mass spectrometer that has a reflectron lens. The reflectron lens is formed of a glass tube having a conductive surface along the length of the tube. The conductive surface has an electrical resistance gradient along its length. The time-of-flight mass spectrometer according to this invention also includes a voltage supply electrically connected to opposite ends of the tube. With the foregoing arrangement, the reflectron lens provides an electric field interior thereto that varies in strength along the length of the lens.

In accordance with a further aspect of the present invention there is provided a method of preparing a glass tube for use as a reflectron lens. The process includes the steps of providing a glass tube wherein the glass contains a lead compound and immersing a portion of the glass tube in an acidic solution. The portion of the glass tube is held in the acidic solution for a time sufficient to remove lead from the surface of the immersed portion of said glass tube. The surface of the glass tube is then chemically reduced to form an electrically resistive layer on the surface of the glass tube. In this manner, the electrical resistance of the portion held in the acidic solution will be lower than the electrical resistance of another portion of the glass tube.

BRIEF DESCRIPTION OF THE DRAWINGS

The foregoing description of the background of the invention, as well as the following description of preferred embodiments of the invention, will be better understood by reference to the drawings wherein.

DETAILED DESCRIPTION

The lead oxide within lead silicate bulk glass is reacted with hydrogen at temperatures ranging from 350-550° C. The chemical reaction occurs on the surface of the work piece, not in the interior of the bulk material. The chemical reaction proceeds as follows:

The reaction yields a semi-conductive form of lead oxide that is uniformly distributed over all surfaces of the work piece. The electrical resistance along the surface is a function of the process parameters of temperature, time, the pressure and composition of the hydrogen/oxygen cover gas, and the composition of the lead silicate glass at the reduction surface.

In order to obtain an electrical resistance that varies along the length of the work piece, it is necessary to either vary the process parameters locally along the piece or change the base material in some way. The hydrogen reduction process is performed in large furnaces with significant gas flows in order to prevent local process variations. The bulk glass material is fabricated in very large batch melts that weigh up to thousands of pounds. Manufacturers strive for uniformity within the melt, thereby making it nearly impossible to produce chemical differences over small distances in the work piece.

One method to change the composition of the glass structure over small distances would be to preferentially remove lead from the surface of the substrate. Preferentially removing lead from the immediate surface in the desired locations would cause those areas to have higher resistances because less lead would be reduced to the semi-conducting form of the lead oxide during the hydrogen reduction process.

Lead can be preferentially removed from the surface of a lead silicate glass in a leaching process by exposing the workpiece to certain acidic solutions. Either hydrochloric or nitric acid, in a concentration of 10%, has been used to preferentially remove lead in desired areas of a resistive glass work piece. Removing the lead from the surface will increase the electrical resistance in the area(s) exposed to the leaching process. Conversely, preventing exposure to the leachant in specific areas will ensure lower resistances in those areas. Experiments have been performed which indicate that the resistance obtained after the reduction process is inversely proportional to the exposure time to the leachant for a given concentration and temperature of the solution.

Figure 6:
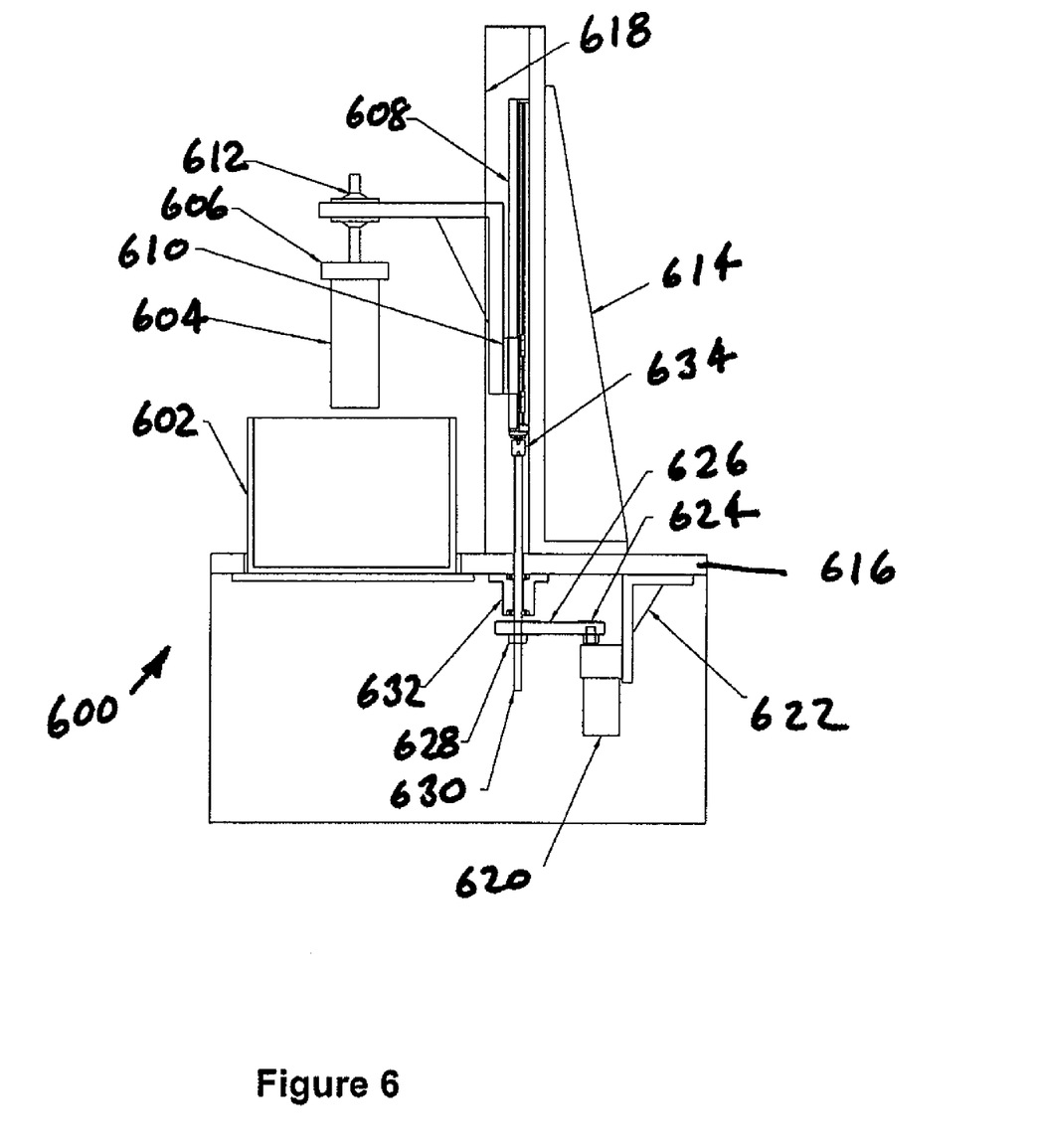
FIG. 6 is a schematic diagram of an apparatus for carrying out selective leaching of lead from a lead silicate glass tube in accordance with the present invention.

In order to control the exposure of the work piece to the leaching solution, it is preferred to have an apparatus for performing the process in a controllable manner. FIG. 6 illustrates such a device. The preferred machine 600 includes an acid tank 602 which holds the acidic solution used for leaching. The work piece 604 is held by a chuck 606 that is attached to a slide mechanism 608. The slide 608 is moved by rotation of a lead screw (not shown). An L-shaped support fixture 610 is attached to the slide 608. The chuck 606 is supported from the fixture 610 with a gimbal 612. The slide mechanism 608 is supported by a mounting bracket 614 that is mounted on a table 616 or other support stand. A shield 618 is provided to protect the slide mechanism 608.

The slide mechanism 608 is connected to a DC stepper motor 620 that is mounted to the table 616. The stepper motor 620 has a drive shaft to which a drive pulley 624 is attached. A second drive pulley 628 mounted on a drive shaft 630 that is connected to the lead screw in the slide mechanism 608. A timing belt 626 connects the first drive pulley 624 to the second drive pulley 628 such that rotation of the stepper motor shaft results in rotation of the drive shaft 630. The drive shaft 630 is coupled to the lead screw with a flexible connector 634 to complete the linkage between the stepper motor 620 and the lead screw. With the arrangement shown in FIG. 6, the glass tube work piece 604 can be precisely moved into and out of the acid tank 602 to permit selective leaching of the lead from the glass.

Figure 7:
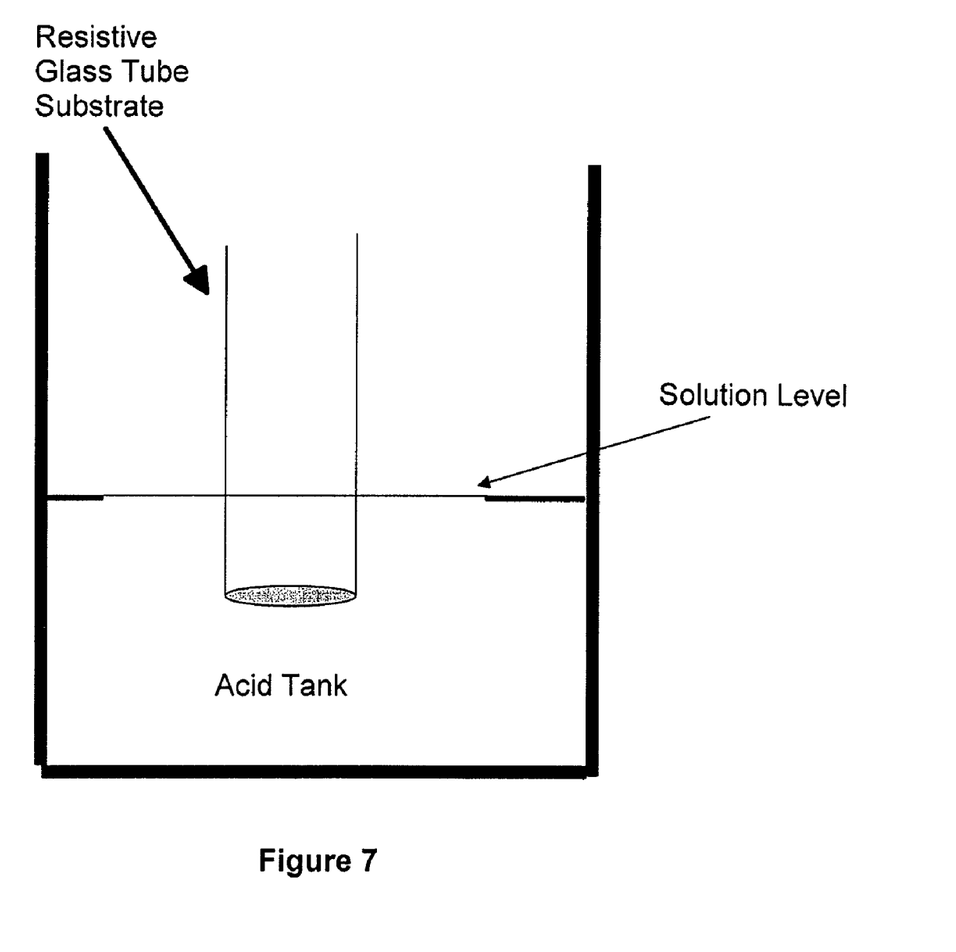
FIG. 7 is a schematic diagram showing the step of selective immersion of a glass tube in a lead leaching solution.
Figure 8:
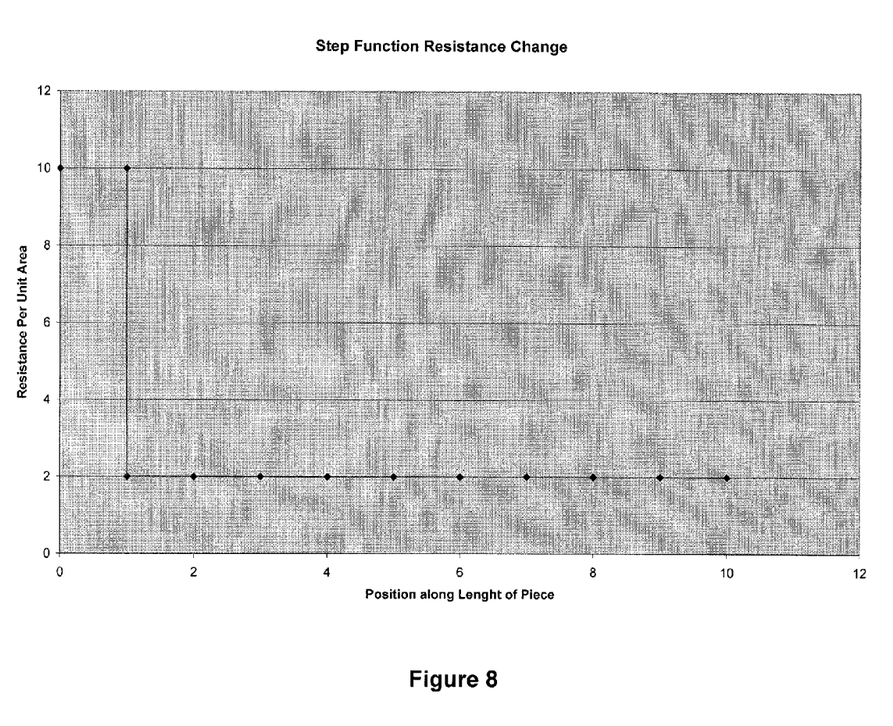
FIG. 8 is a graph of the electrical resistance per unit area of a glass tube prepared in accordance with the present invention wherein the electrical resistance varies in steps.

As shown in FIG. 7, a step-wise resistance gradient is produced by stopping the immersion of the glass tube at a predetermined location along the length of the tube. The tube is held for a time sufficient to achieve a predefined amount of leaching. In this embodiment, the resistance of the portion of the tube immersed in the solution is significantly higher than the portion not exposed to the solution. FIG. 8 illustrates the stepped resistance profile along the length of the glass tube. Please note the y-scale is resistance per unit area, not total end-to-point resistance along the wall of the tube.

Figure 9:
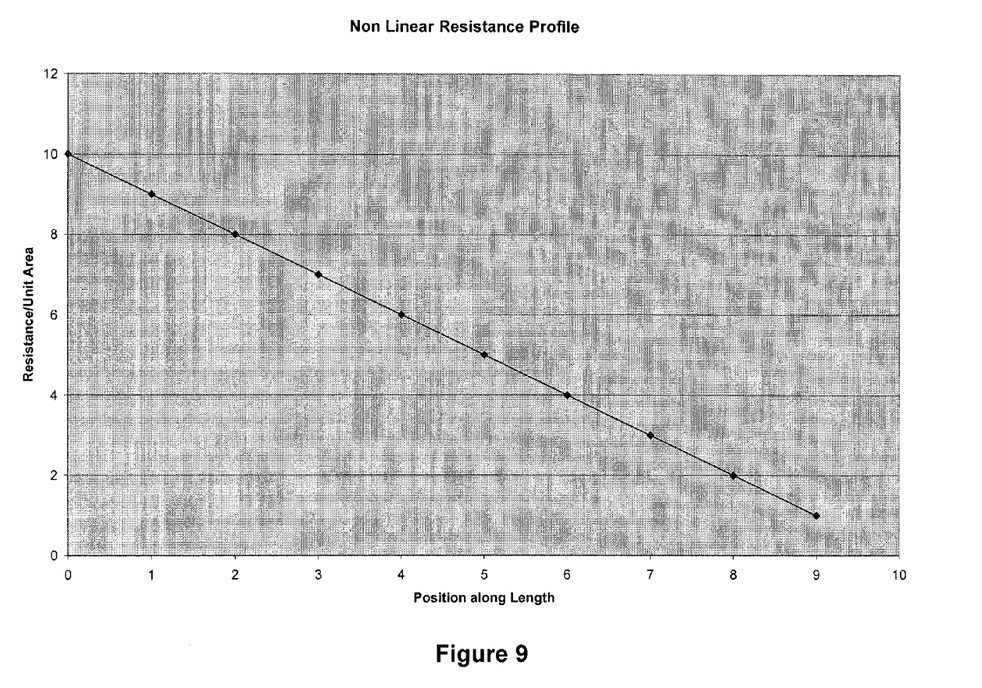
FIG. 9 is a graph of the electrical resistance per unit area of a glass tube prepared in accordance with the present invention wherein the electrical resistance varies linearly.

In another embodiment of the process, the apparatus shown in FIG. 6 can be used to slowly lower the work piece into the acid solution at a controlled rate of speed. Lowering the piece at a fixed rate creates a linear resistance profile as illustrated in FIG. 9.

Figure 10:
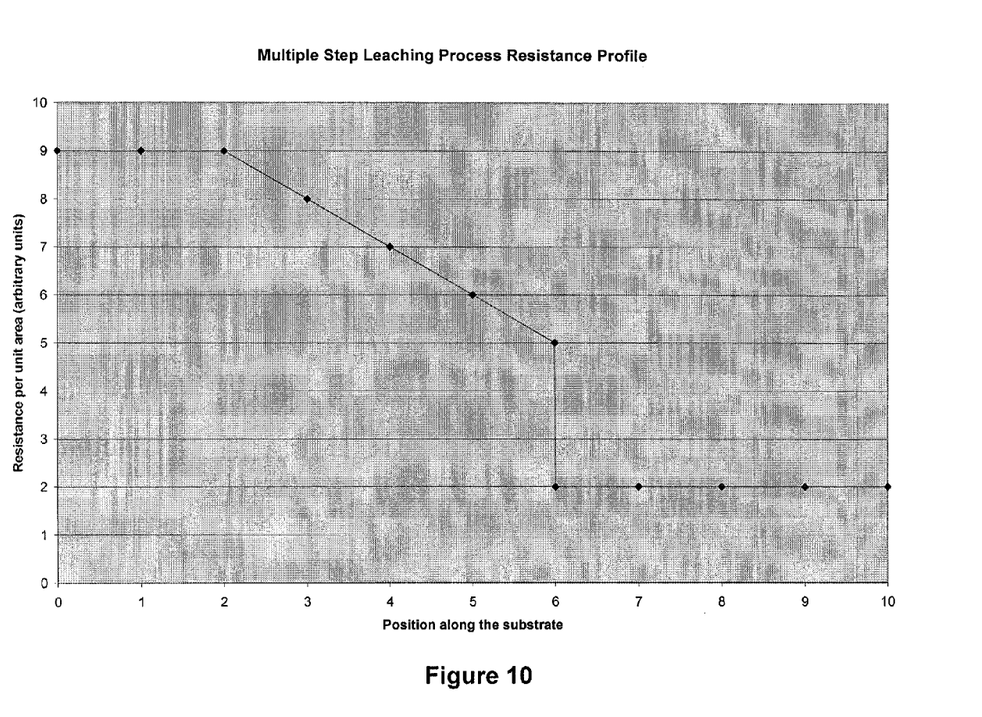
FIG. 10 is a graph of the electrical resistance per unit area of a glass tube prepared in accordance with the present invention wherein the electrical resistance varies nonlinearly.

In other embodiments of the process, the apparatus shown in FIG. 6 is modulated to perform a process in which a combination of the steps described above is performed. For example, a first portion of the glass tube is exposed for a first time period, while a different section is moved continuously as it is exposed, and a third section is not exposed at all. FIG. 10 illustrates the nonlinear resistance profile produced by such a process. In this manner, an unlimited number of resistance profiles can be produced.

Glass tubes having low resistances in the middle portion of the tube length can be produced either by masking the work piece in the area of desired low resistance or flipping the work piece in the holder. Masking materials can be applied by brushing, spraying, taping, or they can be spun on.

Figure 11:
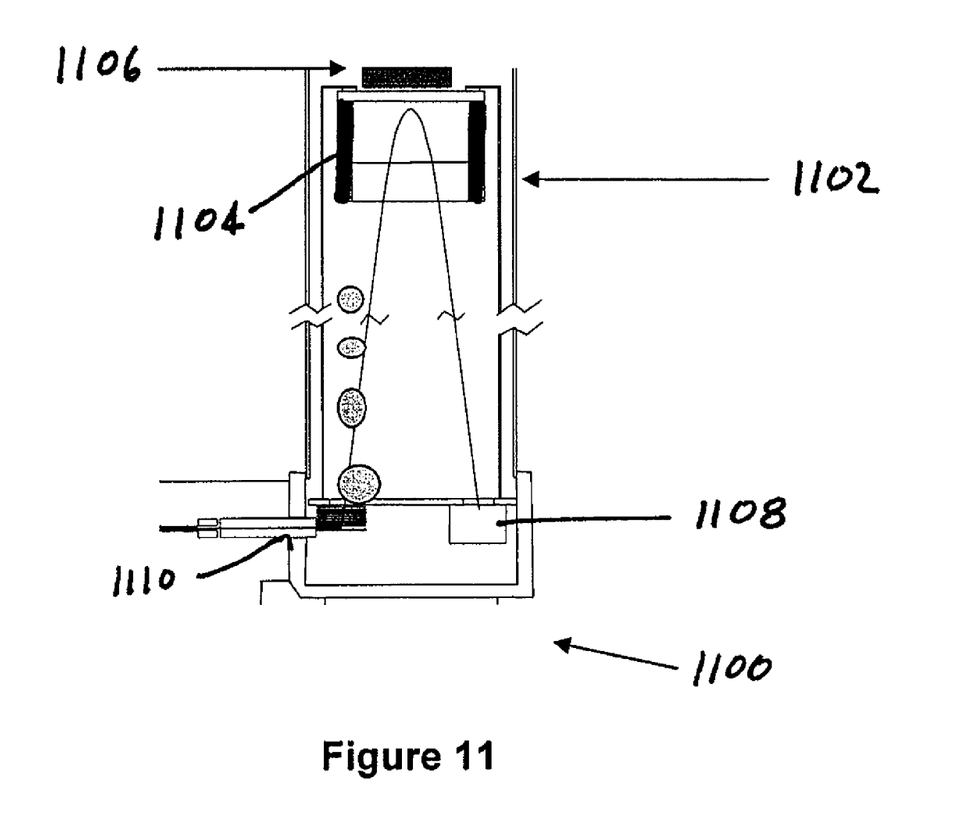
FIG. 11 is a schematic diagram of a reflectron type mass spectrometer utilizing a glass reflectron lens made in accordance with the present invention.

A glass tube made in accordance with the present invention can be used a reflectron lens in a reflectron type mass spectrometer. Such an arrangement is shown in FIG. 11. An ion mass spectrometer 1100 according to the present invention has a flight tube 1102 through which the ions travel. The mass spectrometer 1100 includes a reflectron lens 1104 that is formed from a glass tube having a gradient electrical resistance along the length of its surface. The reflectron lens 1104 is disposed at an end of the flight tube 1102 distal from an ion detector 1108. Preferably, the ion detector 1108 is a microchannel plate-based ion detector. A linear detector may be provided at the reflectron lens end of the flight tube 1102. An ionization section 1110 is provided at the same end of the flight tube 1102 as the ion detector 1108, although spaced therefrom. The ionization section 1110 provides ionized sample material into the flight tube 1102.

It will be recognized by those skilled in the art that changes or modifications may be made to the above-described embodiments without departing from the broad inventive concepts of the invention. It is understood, therefore, that the invention is not limited to the particular embodiments which are described, but is intended to cover all modifications and changes within the scope and spirit of the invention as described above and set forth in the appended claims.

What is claimed is:

1. A reflectron lens comprising a lead silicate glass tube having a lead oxide semiconductive surface layer formed along the length of said glass tube, said lead oxide semiconductive surface layer having an electrical resistance gradient along said length, whereby said tube provides an electric field interior to the tube that varies in strength along the length of the tube when an electric potential is applied to opposing ends of the tube.

2. The reflectron lens set forth in claim 1 wherein the semiconductive surface layer is formed such that the electrical resistance gradient changes linearly along the length of the tube.

3. The reflectron lens set forth in claim 1 wherein the semiconductive surface layer is formed such that the electrical resistance gradient changes in steps along the length of the tube.

4. The reflectron lens set forth in claim 1 wherein the semiconductive surface layer is formed such that the electrical resistance gradient changes nonlinearly along the length of the tube.

5. A mass spectrometer comprising:
a flight tube;
a source of ions positioned at a first end of said flight tube;
an ion detector positioned at the first end of said flight tube and in spaced relation to said source of ions;

a reflectron lens positioned in said flight tube at a second end thereof that is distal from said ion detector; and a voltage supply electrically connected to opposing ends of said reflectron lens;

wherein said reflectron lens comprises a lead silicate glass tube having a lead oxide semiconductive surface layer extending along the length of the glass tube and said lead oxide semiconductive surface layer has an electrical resistance gradient along said length, whereby said reflectron lens provides an electric field interior thereto that varies in strength along the length of said lens.

6. The mass spectrometer set forth in claim 5 wherein the semiconductive surface layer is formed such that the electrical resistance gradient changes linearly along the length of the glass tube.

7. The mass spectrometer set forth in claim 5 wherein the semiconductive surface layer is formed such that the electrical resistance gradient changes in steps along the length of the glass tube.

8. The mass spectrometer set forth in claim 5 wherein the semiconductive surface layer is formed such that the electrical resistance gradient changes nonlinearly along the length of the glass tube.

9. A reflectron lens comprising a lead silicate glass tube having a semiconductive surface layer along the length of the surface of said tube, said semiconductive surface layer comprising a plurality of lead oxide semiconducting areas formed in the surface of the glass that provide an electrical resistance gradient along said length, whereby said tube provides an electric field interior to the tube that varies in strength along the length of the tube when an electric potential is applied to opposing ends of the tube.

10. The reflectron lens set forth in claim 9 wherein the plurality of lead oxide semiconducting areas are formed such that the electrical resistance gradient changes linearly along the length of the tube.

11. The reflectron lens set forth in claim 9 wherein the plurality of lead oxide semiconducting areas are formed such that the electrical resistance gradient changes in steps along the length of the tube.

12. The reflectron lens set forth in claim 9 wherein the plurality of lead oxide semiconducting areas are formed such that the electrical resistance gradient changes nonlinearly along the length of the tube.

13. A mass spectrometer comprising:
a flight tube;
a source of ions positioned at a first end of said flight tube;
an ion detector positioned at the first end of said flight tube and in spaced relation to said source of ions;
a reflectron lens positioned in said flight tube at a second end thereof that is distal from said ion detector; and
a voltage supply electrically connected to opposing ends of said reflectron lens;
wherein said reflectron lens comprises a lead silicate glass tube having a semiconductive surface layer extending along the length of the glass tube and said semiconductive surface layer comprises a plurality of lead oxide semiconducting areas formed in the surface of the glass that provide an electrical resistance gradient along said length, whereby said reflectron lens provides an electric field interior thereto that varies in strength along the length of said lens.

14. The mass spectrometer set forth in claim 13 wherein the plurality of lead oxide semiconducting areas are formed such that the electrical resistance gradient changes linearly along the length of the glass tube.

15. The mass spectrometer set forth in claim 13 wherein the plurality of lead oxide semiconducting areas are formed such that the electrical resistance gradient changes in steps along the length of the glass tube.

16. The mass spectrometer set forth in claim 13 wherein the plurality of lead oxide semiconducting areas are formed such that the electrical resistance gradient changes nonlinearly along the length of the glass tube.

17. A method of preparing a glass tube for use as a reflectron lens comprising the steps of:
providing a glass tube wherein the glass contains a lead compound;
immersing a portion of said glass tube in a solution that removes lead from the surface of the glass tube;
holding said portion of the glass tube in the solution for a time sufficient to remove lead from the surface of the immersed portion of said glass tube; and then
chemically reducing the surface of the glass tube to form an electrically resistive layer on the surface of the glass tube, whereby the electrical resistance of the portion held in the acidic solution is lower than the electrical resistance of the other portion of the glass tube;
whereby said glass tube has a conductive surface along the length of said tube, said conductive surface having an electrical resistance gradient along said length, and said tube provides an electric field interior to the tube that varies in strength along the length of the tube when an electric potential is applied to opposing ends of the tube.

18. The method set forth in claim 17 wherein the step of providing the glass tube comprises the step of providing a lead silicate glass tube.

19. The method set forth in claim 17 wherein before said chemically reducing step, performing the further steps of immersing a second portion of said glass tube in the lead-removal solution and holding said second portion in the solution for a time sufficient to remove lead from the surface of the immersed second portion of the glass tube.

20. The method set forth in claim 17 wherein the lead removal solution comprises an acidic solution.

21. The method set forth in claim 17 wherein the step of holding the portion of the glass tube in the lead removal solution comprises the step of moving the glass tube into the solution at a speed selected to provide removal of lead in a linear manner along the length of the glass tube.

* * * * *